United States Patent
Lau et al.

(10) Patent No.: US 7,605,825 B1
(45) Date of Patent: Oct. 20, 2009

(54) FAST ZOOM-ADAPTABLE ANTI-ALIASING OF LINES USING A GRAPHICS PROCESSING UNIT

(75) Inventors: Cynthia W. Lau, Campbell, CA (US); Alexandre S. Parenteau, San Jose, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 381 days.

(21) Appl. No.: 11/586,042

(22) Filed: Oct. 24, 2006

(51) Int. Cl.
*G06T 17/00* (2006.01)
*G06T 1/60* (2006.01)
*G09G 5/00* (2006.01)
*G06K 9/40* (2006.01)

(52) U.S. Cl. .................. 345/611; 345/428; 345/522; 382/254; 382/266; 382/269; 382/274

(58) Field of Classification Search .......... 345/418, 345/421, 426, 428, 581, 611, 618, 522, 501, 345/551, 565; 382/254, 258, 266, 269, 274, 382/303–305
See application file for complete search history.

(56) References Cited

U.S. PATENT DOCUMENTS

| | | | | |
|---|---|---|---|---|
| 4,843,388 A | * | 6/1989 | Miyamoto | 341/15 |
| 5,872,902 A | * | 2/1999 | Kuchkuda et al. | 345/615 |
| 5,940,080 A | * | 8/1999 | Ruehle et al. | 345/611 |
| 6,529,196 B1 | * | 3/2003 | Holt | 345/443 |
| 6,954,211 B2 | | 10/2005 | Michail et al. | |
| 7,050,067 B2 | | 5/2006 | Raubacher et al. | |
| 2004/0190617 A1 | * | 9/2004 | Shen et al. | 375/240.16 |
| 2005/0195189 A1 | * | 9/2005 | Raman et al. | 345/424 |
| 2007/0165035 A1 | * | 7/2007 | Duluk et al. | 345/506 |

OTHER PUBLICATIONS

Chan, Eric, "Fast Antialiasing Using Prefiltered Lines on Graphics Hardware," Article, Mar. 1, 2004.

* cited by examiner

*Primary Examiner*—Wesner Sajous
(74) *Attorney, Agent, or Firm*—Robert C. Kowert; Meyertons, Hood, Kivlin, Kowert & Goetzel, P.C.

(57) ABSTRACT

A method, system, and computer-readable storage medium are disclosed for performing anti-aliasing operations on lines using a graphics processing unit (GPU). Input comprising a plurality of vertices may be received at a GPU. The plurality of vertices may represent one or more line segments. One or more anti-aliased line segments may be generated based on the input. In generating the one or more anti-aliased line segments, the intensity of a first edge and a second edge of each line segment may be modified based on application of an anti-aliasing function. A maximum intensity of a central portion may be maintained for at least one of the line segments, wherein the central portion is between the two edges and is greater than one pixel in thickness.

26 Claims, 7 Drawing Sheets

FAST ZOOM-ADAPTABLE ANTI-ALIASING OF LINES USING A GRAPHICS PROCESSING UNIT

BACKGROUND

1. Field of the Invention

The present invention is directed to computer systems; and more particularly, it is directed to utilization of graphics processors associated with computer systems for anti-aliasing operations.

2. Description of the Related Art

As the power and complexity of personal computer systems increase, graphics operations are increasingly being performed by dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes a plurality of execution channels that can be used simultaneously. A GPU may also include dedicated structures or built-in program instructions for anti-aliasing rendered objects. Anti-aliasing is any technique for minimizing the jagged, pixilated, or "aliased" edges of objects. Typically, aliasing occurs on objects with non-orthogonal edges, and anti-aliasing may be used to provide a smoother appearance for those edges on a display screen or other rendered image. GPUs with dedicated anti-aliasing features often use techniques such as multi-sampling and super-sampling. However, these techniques may require extensive use of the GPU's built-in memory and resources. Additionally, these techniques are approximations that may not result in high-quality anti-aliasing.

An alternative approach developed by Eric Chan ("Fast Antialiasing Using Prefiltered Lines On Graphics Hardware," Massachusetts Institute of Technology, Feb. 28, 2004; also published as "Fast Prefiltered Lines," GPU Gems 2, pages 345-359) described a technique for anti-aliasing of thin lines using a GPU. The Chan technique involves drawing the line with its width increased by a fixed amount, executing a pixel shader program on the GPU to index into a one-dimensional texture containing an anti-aliasing function, and modifying the intensity of each pixel so that pixels near the center of the line have the highest intensity while pixels near the edge have the lowest intensity. An anti-aliasing function can be calculated once for a number of samples and stored in the one-dimensional texture for efficient re-use. However, because the anti-aliasing function is applied to the entire line, regardless of its thickness, this prefiltered line technique is limited in scope.

SUMMARY

Various embodiments of systems, methods, and computer-readable storage media for performing anti-aliasing operations on lines using a graphics processing unit (GPU) are disclosed. According to one embodiment, input comprising a plurality of vertices may be received at a GPU. The plurality of vertices may represent one or more line segments. One or more anti-aliased line segments may be generated based on the input. In generating the one or more anti-aliased line segments, the intensity of a first edge and a second edge of each line segment may be modified based on application of an anti-aliasing function. A maximum intensity of a central portion may be maintained for at least one of the line segments, wherein the central portion is between the two edges and is greater than one pixel in thickness.

According to one embodiment, each line segment may be expanded by a radius r on both the first edge of the line and the second (opposite) edge of the line. The value of the radius may represent a desired thickness of the "smoothed" or "blurred" edges of the anti-aliased line segment. Additional vertices may be added to the line segment(s) in the expansion process. The array of vertices may be sent from the CPU to the GPU in a single batch. The geometry may be stored on the GPU so that additional transfers from the CPU to the GPU are not required. For example, if a zoom factor of the line segment(s) changes, then the anti-aliasing function may be modified by the zoom factor, and the zoomed line segment(s) may be redrawn efficiently after retrieving the stored vertices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
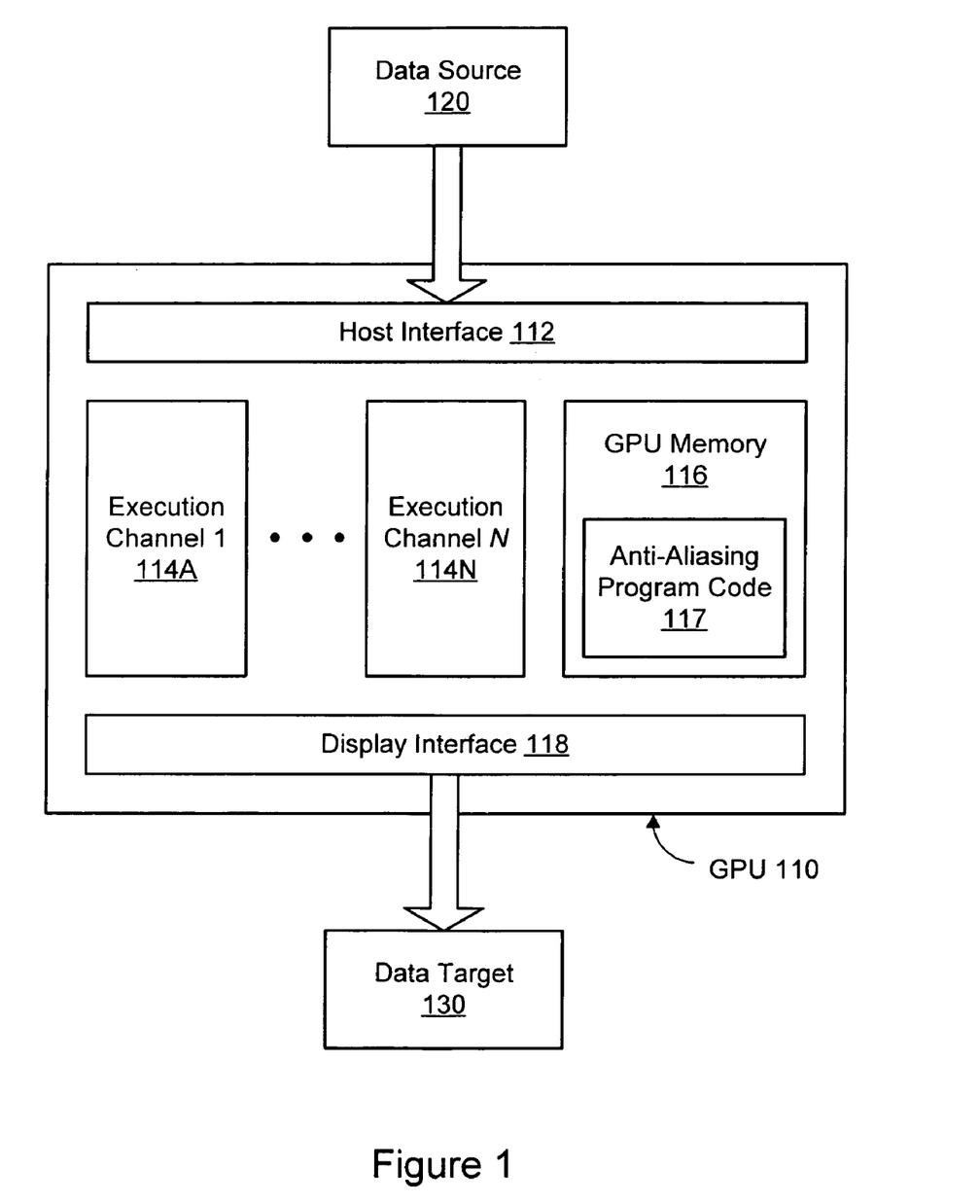
FIG. 1 is a block diagram illustrating one embodiment of a system configured to perform an anti-aliasing operation using a GPU.
Figure 11:
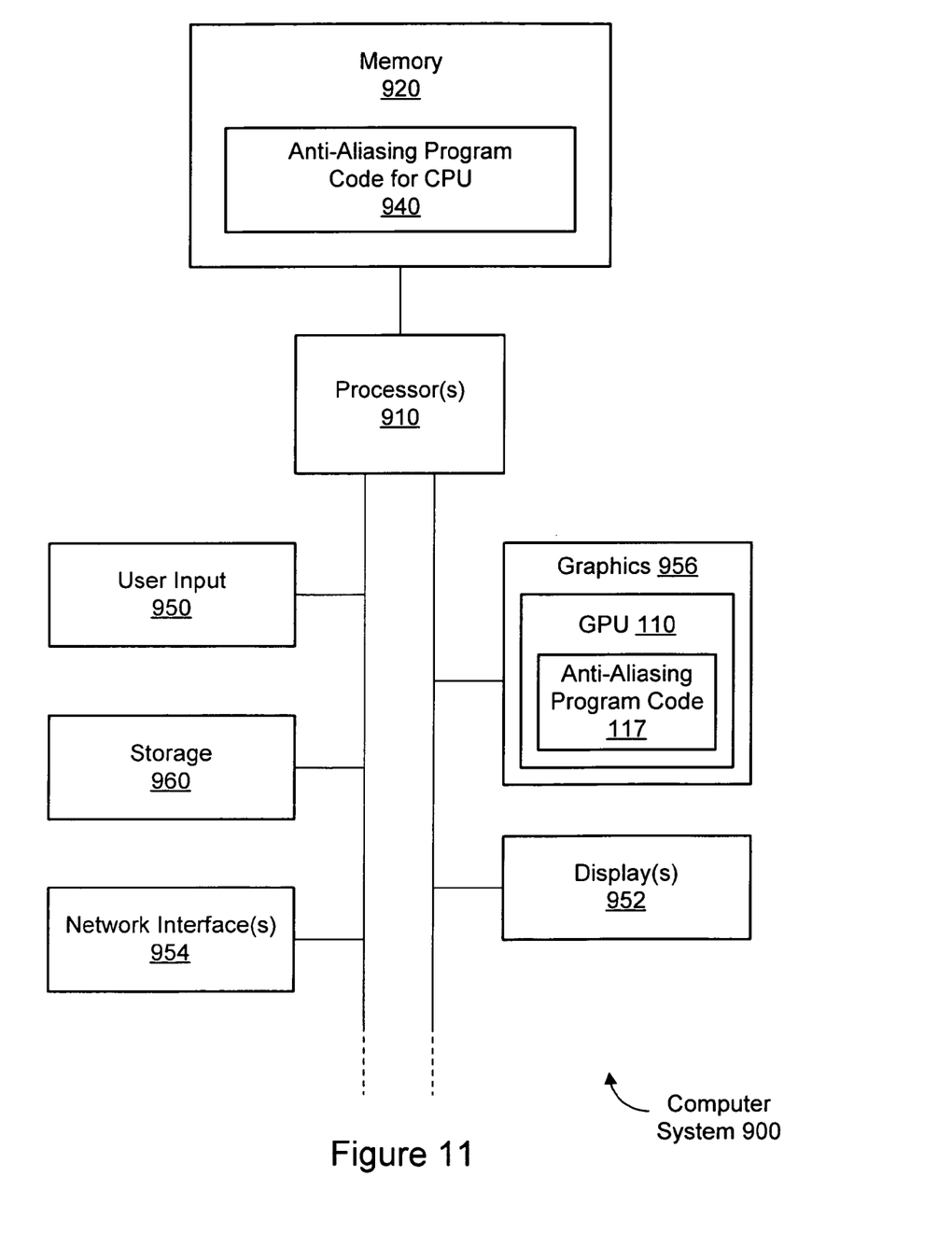
FIG. 11 is a block diagram illustrating constituent elements of a computer system that is configured to implement embodiments of the system and method for anti-aliasing.

FIG. 1 is a block diagram illustrating one embodiment of a system configured to perform fast anti-aliasing of lines on a GPU according to the techniques described below. A graphics processing unit (GPU) 110, also referred to herein as a graphics processor, may comprise a dedicated graphics rendering device associated with a computer system. An example of a suitable computer system 900 for use with a GPU 110 is illustrated in FIG. 11. Turning back to FIG. 1, a GPU 110 may include numerous specialized components configured to optimize the speed of rendering graphics output. For example, a GPU 110 may include specialized components for rendering three-dimensional structures, for applying textures to surfaces, etc. For the sake of illustration, however, only a limited selection of components is shown in the example GPU 110 of FIG. 1. It is contemplated that GPU architectures other than the example architecture of FIG. 1 may be suitable for implementing the techniques described herein. Suitable GPUs 110 may be commercially available from vendors such as NVIDIA Corporation, ATI Technologies, and others.

The GPU 110 may include a host interface 112 configured to communicate with a data source 120 (e.g., a communications bus and/or processor(s) 910 of a host computer system 900, or the host system itself). For example, the data source 120 may provide input data and/or executable program code to the GPU 110. In some embodiments, the host interface 112 may permit the movement of data in both directions between the GPU 110 and the data source 120. The GPU 110 may also include a display interface 118 for providing output data to a data target 130. For example, the data target 130 may comprise a display device 952, and the GPU 110 (along with other graphics components and/or interfaces 956) may "drive" the display 952 by providing graphics data at a particular rate from a frame buffer.

In one embodiment, the GPU 110 may include internal memory 116. The GPU memory 116, also referred to herein as "video memory" or "VRAM," may comprise random-access memory (RAM) which is accessible to other GPU components. As will be described in greater detail below, the GPU memory 116 may be used in some embodiments to store various types of data and instructions such as input data, output data, intermediate data, program instructions for performing various tasks, etc. In one embodiment, the GPU 110 may also be configured to access memory 920 of a host computer system 900 via the host interface 112.

In one embodiment, the GPU 110 may include a plurality of execution channels 114A-114N as illustrated in FIG. 1. Using the plurality of execution channels 114A-114N, the GPU 110 may process a plurality of tasks in a substantially parallel manner, such that a plurality of the execution channels 114A-114N are simultaneously in use. Each of the execution channels 114A-114N may perform tasks independent of the other execution channels 114A-114N. The GPU 110 may be configured to process multi-channel input and produce multi-channel output. Multi-channel input may comprise vectorized input, and multi-channel output may comprise vectorized output. In one embodiment, the data in one channel of the multi-channel input may be processed by the GPU 110 independently of the data in the other channels. In one embodiment, the multi-channel input and multi-channel output may comprise graphical data having a plurality of channels. For example, the plurality of channels may represent RGBA data (data comprising separate channels for red, green, blue, and alpha data), vertices, textures, etc. The plurality of channels may comprise overlapping channels in a rectangular area of graphical data. In one embodiment, the number of the channels in the multi-channel input and multi-channel output may be equal to the number of execution channels in the GPU 110 for optimal parallel processing. In one embodiment, the GPU 110 may include additional components configured to control the plurality of execution channels 114A-114N, such as by distributing portions of the multi-channel input to individual execution channels. In this manner, the GPU 110 may perform operations on multi-channel input data.

The GPU 110 may also be configured to perform single-channel operations on single-channel data using only one of the plurality of execution channels 114A-114N. A single-channel operation may comprise an operation on non-vectorized input or input having only one channel (e.g., graphical data having only one channel). When the GPU 110 is used in this manner, however, the remaining execution channels may be idle.

By performing the anti-aliasing on the GPU, the computational load on the host CPU may be reduced. Program code 117 comprising instructions for performing the anti-aliasing may be provided to the GPU 110. The program code may be stored in the GPU memory 116 and executed by one or more of the execution channels 114A-114D. The program code 117 may be configured to fetch and process a plurality of channels of input data in a parallel manner. In one embodiment, the program code 117 may be provided to the GPU 110 by the CPU 910 or other components of the computer system shown in FIG. 11. In another embodiment, the program code 117 may be native to the GPU 110.

The program code 117 may comprise a vertex shader and/or a pixel shader. A vertex shader comprises program instructions that are executable by the GPU to determine properties (e.g., position) of a particular vertex. A vertex shader may expect input such as uniform variables (e.g., constant values for each invocation of the vertex shader) and vertex attributes (e.g., per-vertex data). A pixel shader comprises program instructions that are executable by the GPU to determine properties (e.g., color) of a particular pixel. A pixel shader may expect input such as uniform variables (e.g., constant values for each invocation of the pixel shader) and pixel attributes (e.g., per-pixel data). In rendering the anti-aliased lines, both the vertex shader and the pixel shader may be executed at various points in the graphics pipeline.

Figure 2:
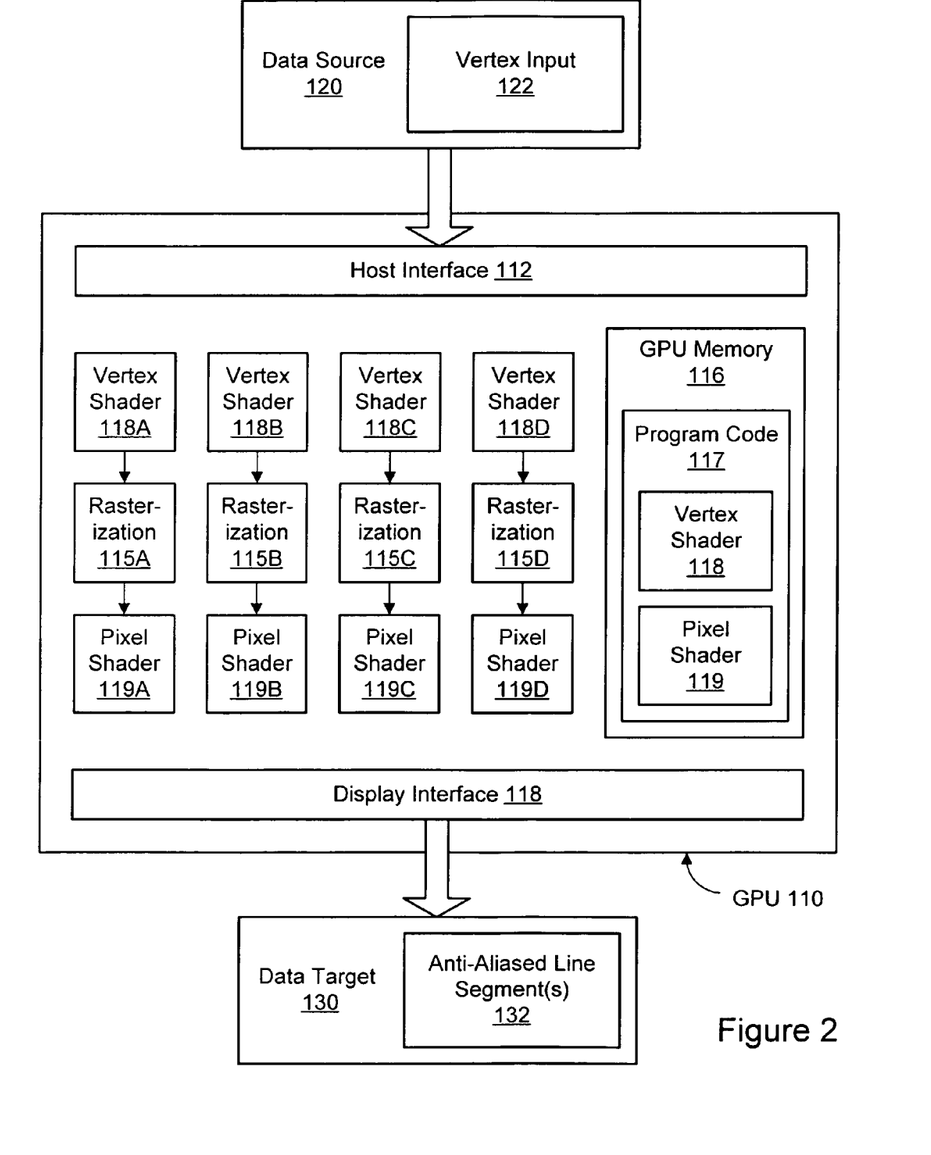
FIG. 2 is a block diagram illustrating one embodiment of a system configured to perform an anti-aliasing operation using multiple execution channels of a GPU.

FIG. 2 is a block diagram illustrating one embodiment of a system configured to perform an anti-aliasing operation on one or more line segments using multiple (e.g., four) execution channels 114A-114D of a GPU. Input 122 comprising a plurality of vertices (representing one or more line segments) may be provided to the GPU 110 by a data source 120 such as a host CPU. In one embodiment, the line segment(s) may be tessellated on the CPU prior to being sent to the GPU. In one embodiment, the line segment(s) in the input 122 may be distributed to different ones of the execution channels 114A-114D for efficient parallel processing. In each of the execution channels, a vertex shader 118A-118D may be executed to determine vertex values for each input vertex as will be described in greater detail below. Next, in a rasterization step 115A-115D, the vertex values may be converted to pixel values. In each of the execution channels, a pixel shader 119A-119D may then be executed on the pixel values to determine a final color of each pixel for the display output as will be described in greater detail below. Collectively, the pixel values may comprise one or more anti-aliased line segments. The final anti-aliased line segment(s) may be provided as output 132, e.g., for display on a display device coupled to the host computer system. In another embodiment, a different number of execution channels (i.e., as few as one) may be used to perform the anti-aliasing operation.

In one embodiment, the anti-aliasing system and method described herein may provide for the rendering of anti-aliased lines having substantially any thickness. The line thickness and rendering resolution may be taken into account such that an intensity gradient is applied to the two edges of the line while the central portion of the line may be left substantially unaltered. By contrast, the prefiltered line technique described by Chan applies the intensity gradient through the entire thickness line from one edge to the other edge, regardless of line thickness.

Figure 3:
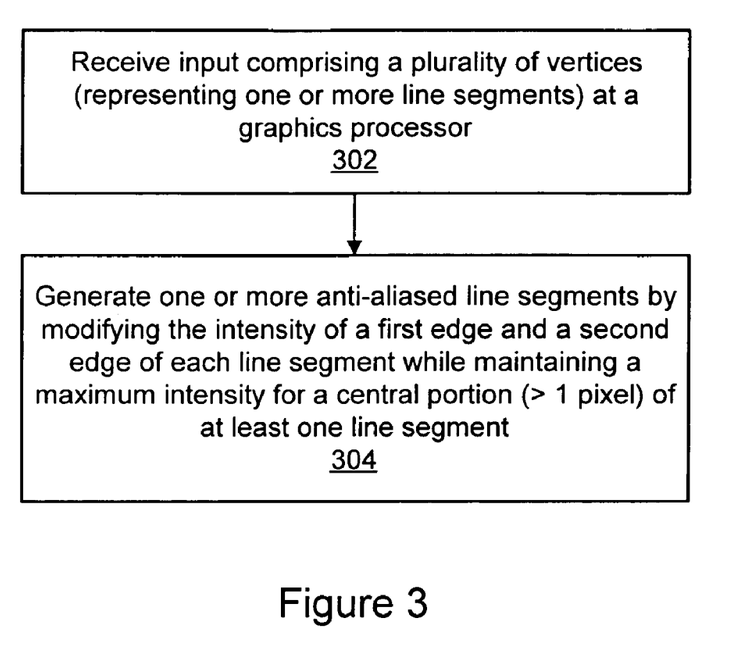
FIG. 3 is a flow diagram illustrating a method for performing an anti-aliasing operation using a GPU according to one embodiment.

FIG. 3 is a flow diagram illustrating a method for performing an anti-aliasing operation using a GPU according to one embodiment. As shown in block 302, input comprising a plurality of vertices may be received at a GPU 110. The plurality of vertices may represent one or more line segments. As shown in block 304, one or more anti-aliased line segments may be generated based on the input. In generating the one or more anti-aliased line segments, the intensity of a first edge and a second edge of each line segment may be modified based on application of an anti-aliasing function. A maximum intensity of a central portion may be maintained for at least one of the line segments, wherein the central portion is between the two edges and is greater than one pixel in thickness. The anti-aliased line segments may be generated at the GPU 110 by executing appropriate program code 117 (e.g., a vertex shader 118 and pixel shader 119) as discussed with reference to FIGS. 1 and 2. The generation of the anti-aliased line segment(s) is discussed in greater detail below.

Figure 4:
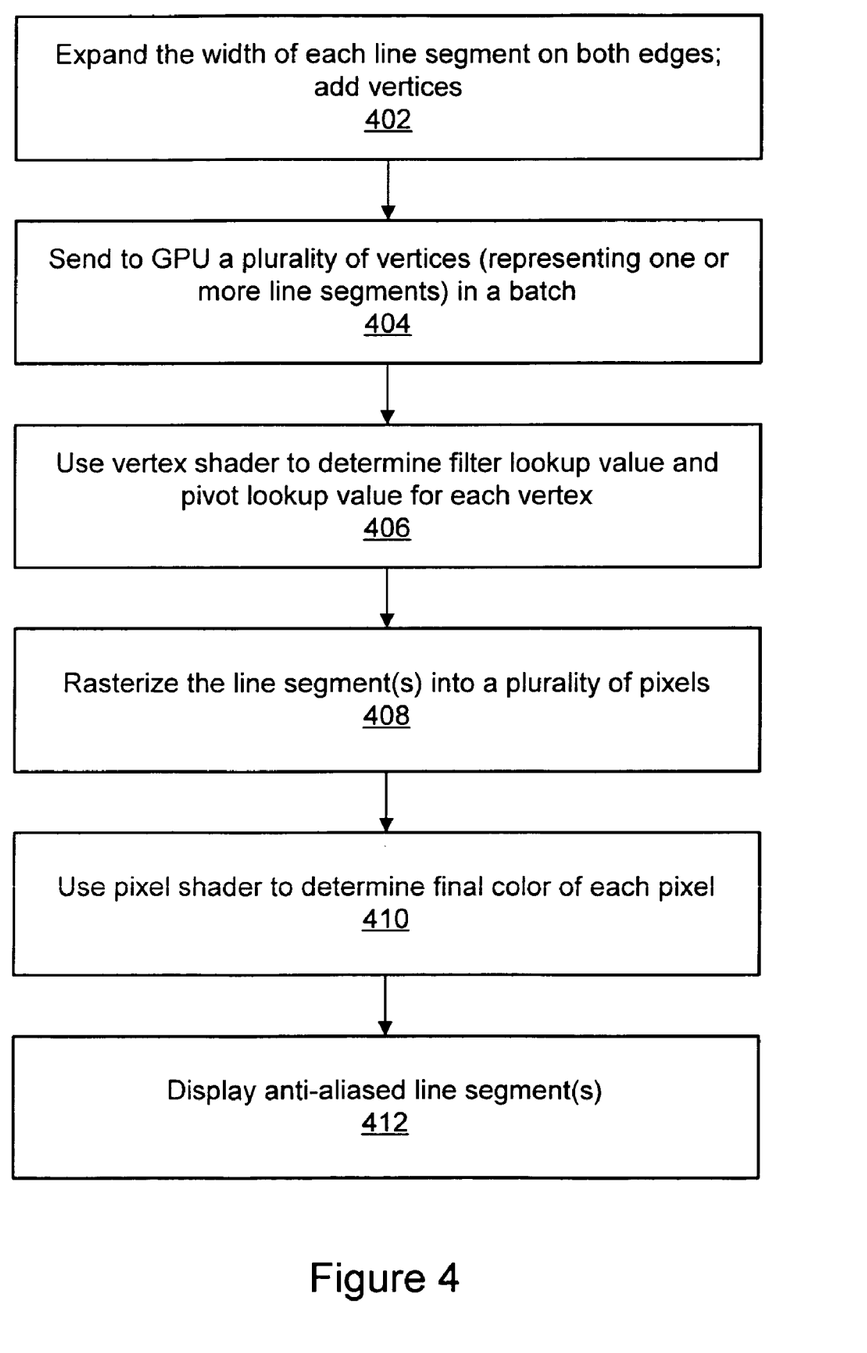
FIG. 4 is a flow diagram illustrating further aspects of a method for performing an anti-aliasing operation using a GPU according to one embodiment.

FIG. 4 is a flow diagram illustrating further aspects of a method for performing an anti-aliasing operation using a GPU according to one embodiment. One or more line segments may be provided as input for an anti-aliasing operation. Each line segment may be defined by two vertices such that the vertices represent a position of the line segment in a two-dimensional space. If any line segments share vertices with other line segments, then the total number of vertices in the input may be less than twice the number of total line segments. As shown in block 402, the width of each line segment may be expanded. Given a desired line width w, the width w may be expanded by a radius r on both the first edge of the line and the second (opposite) edge of the line. The two edges of the line may also be referred to as the top and bottom edges or as the right and left edges, depending upon the orientation of the line. After expanding the edges, the new width of the line is w+2r.

The value r may comprise the filter radius for the anti-aliasing function. As will be shown in greater detail below, the value of the filter radius may represent a desired thickness of the "smoothed" or "blurred" edges of the anti-aliased line. In various embodiments, suitable values of r may include 0.5 pixels, 0.75 pixels, etc. The value of r may be hard-coded for all line segments or may vary from line segment to line segment.

Figure 5:
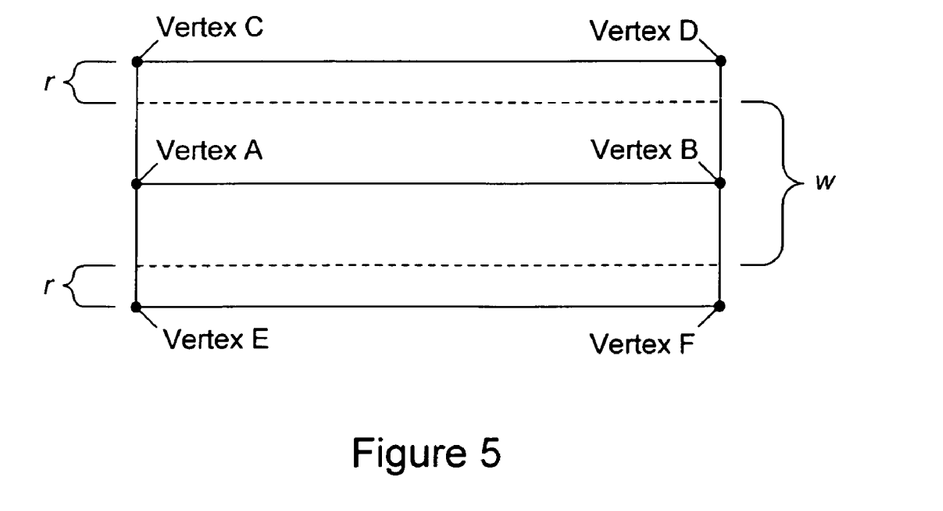
FIG. 5 illustrates an expanded line segment with additional vertices according to one embodiment.

The line segment(s) may be tessellated (i.e., reduced to polygons) at the new line width of w+2r. In one embodiment, additional vertices may be added to the line segment(s) in the expansion process. FIG. 5 illustrates an expanded line segment with additional vertices according to one embodiment. Vertex A and vertex B define the original line segment. Vertex C and vertex D define an expanded top edge. Vertex E and vertex F define an expanded lower edge. If vertex A and/or vertex B is shared with another line segment, then the appropriate additional vertices may be shared as well. In one embodiment, each line segment may be tessellated as a pair of adjacent rectangles such that the segment is split in half lengthwise around the original line segment defined by vertices A and B.

For purposes of illustration, the line segment shown in FIG. 5 has a relatively wide stroke such that w=4r. However, the system and method described herein may be applied to a line segment having a thinner or thicker stroke. The line segment of FIG. 5 may be orthogonal or non-orthogonal to either the X or Y axis of the two-dimensional space; in other words, the line segment may have any orientation with respect to the X or Y axis.

A one-dimensional texture coordinate may be added to each vertex, with the line width of w+2r as its absolute value. The sign of the texture coordinate may be toggled to distinguish between vertices that lie on the edges of the line segment (i.e., vertices C, D, E, and F) as opposed to the vertices that lie in the center of the line segment (i.e., vertices A and B). In the example of FIG. 5, therefore, the texture coordinate may be w+2r for vertices A and B and −(w+2r) for vertices C, D, E, and F.

A current zoom factor may be stored during tessellation. In one embodiment, the zoom factor may be represented as a uniform variable which is associated with all the line segments in the artwork tree. If the zoom factor changes in future redraws of the line segment(s), the ratio of the new zoom radius with the tessellation zoom radius may be calculated and sent as a uniform variable to the vertex shader on the GPU.

In one embodiment, the operation represented by block 402 may be performed by a CPU on the host computer system. As shown in block 404 of FIG. 4, the vertices (including any uniform variables and per-vertex values) may be sent to the GPU 110 for rendering. The GPU 110 may be instructed to draw the vertices as quads or as triangles. In one embodiment, the anti-aliasing system and method described herein may use batch processing for efficient use of system resources. Using a single API call, an array of vertices may be sent by the CPU to the GPU only once in a contiguous portion of memory. The geometry may be stored on the GPU so that additional transfers from the CPU to the GPU are not required. Based on the stored geometry, the plurality of lines may be re-drawn using a single API (application programming interface) call. This vertex-buffering technique may yield much faster processing and re-processing of anti-aliased lines that the prefiltered line technique described by Chan, which uses immediate-mode drawing. In one embodiment, the anti-aliasing technique described herein is not dependent on per-segment uniform variables. Instead, the information usable for computing the intensity values may be stored directly in the vertex texture data. Therefore, the anti-aliasing system and method may avoid making expensive API calls to transfer data from the CPU to the GPU for each line segment.

The vertex shader 118 on the GPU 110 may take as input the position of each vertex and its one-dimensional texture coordinate (i.e., the line width w+2r plus the sign indicating whether the vertex is an edge vertex or a central vertex). As shown in block 406, the vertex shader may determine two output values for each vertex. The output values may be represented as a two-dimensional texture coordinate. In one embodiment, the output values may comprise a filter lookup value and a pivot lookup value for each vertex.

The filter lookup value may comprise the intensity of the vertex as produced by an anti-aliasing function. In one embodiment, if a box filter is used for the anti-aliasing function, then the intensity is a linear function of the line width.

Therefore, no texture lookup is needed if a box filter is used for the anti-aliasing function in one embodiment. For other types of filters, a new texture coordinate may be calculated that will be used to index into a one-dimensional anti-aliasing function texture. The texture may comprise a gradient (e.g., a grayscale spectrum). In one embodiment, the edge vertices may be assigned a minimum intensity value (e.g., fully transparent) as the filter lookup value, and the center vertices may be assigned a maximum intensity value (e.g., fully opaque) as the filter lookup value. The minimum intensity may be 0.0, and the maximum intensity may be 1.0. Values between 0.0 and 1.0 may sample the appropriate pixels in the one-dimensional texture, and values may be interpolated between available pixels if necessary.

Figure 6:
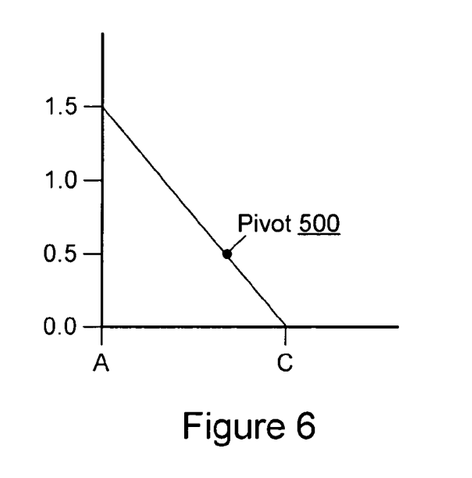
FIG. 6 illustrates a graph of lookup values for a line segment according to one embodiment.
Figure 7:
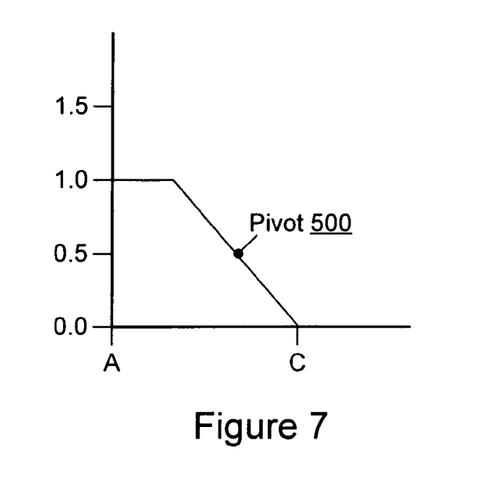
FIG. 7 illustrates a modified graph of lookup values for a line segment according to one embodiment.

In one embodiment, the filter lookup value of a center vertex (e.g., vertices A and B) may be greater than 1.0 depending on the thickness of the line segment. In the example line segment shown in FIG. 5, for example, the filter lookup value of vertex A and vertex B may be 1.5. Filter lookup values less than 0.0 may be clamped to 0.0, and filter lookup values greater than 1.0 may be clamped to 1.0. FIG. 6 illustrates a graph of lookup values for a segment (e.g., as shown in FIG. 5) having a central intensity of 1.5 (e.g., at vertex A) according to one embodiment. FIG. 7 illustrates a modified graph of lookup values for a line segment according to one embodiment. In the example of FIG. 7, the intensity of 1.5 has been clamped to 1.0.

The pivot lookup value may comprise the lookup value (e.g., intensity) at the original or "true" line edge, as if the line segment had never been expanded. The pivot lookup value may also be referred to as the "pivot point." The pivot lookup value may comprise a linearly interpreted value between the minimum intensity and the maximum intensity. In one embodiment, the pivot lookup value may be a constant value (e.g., 0.5) that is not calculated anew for every vertex. In the example graphs of FIG. 6 and FIG. 7, the pivot point 500 is associated with a value of 0.5.

As shown in block 408, the one or more line segments may be rasterized by the GPU to generate a plurality of pixels. In the rasterization step, the two texture coordinates output by the vertex shader may be bilinearly interpolated. The filter lookup values at the vertices may be bilinearly interpolated across pixels, depending on the positions of the pixels relative to the positions of the original vertices. The pivot lookup values may be constant across all pixels along the "true" edge of the line segment.

As shown in block 410, the pixel shader may use the pixel's desired color, the filter lookup value, and the pivot lookup value to determine the final color of each pixel generated in block 408. The pixel shader may use the filter lookup value to index into the anti-aliasing filter texture to determine the intensity. The final intensity may be clamped between 0.0 and 1.0. As discussed above, the anti-aliasing function is essentially the identity function if a box filter is used. The intensity may be multiplied by the pixel's alpha value to produce a final color value for the pixel. The adjusted pixel alphas may result in a high-quality anti-aliasing effect for the line segment(s).

Figure 8:
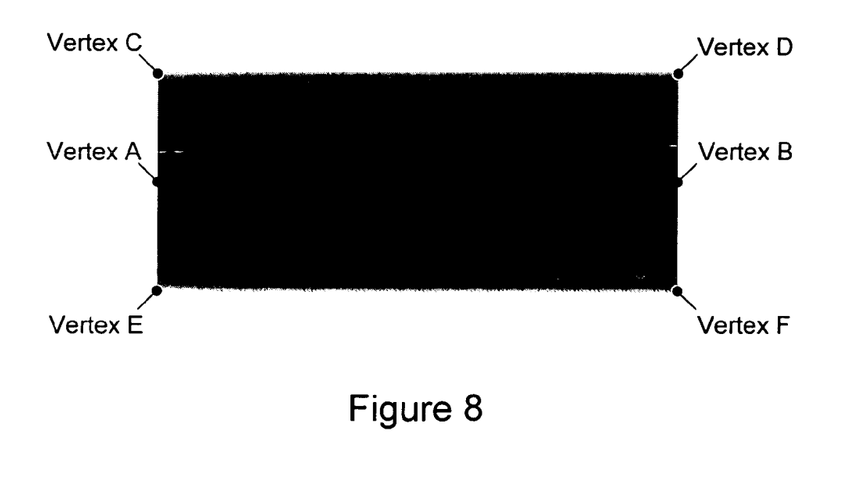
FIG. 8 illustrates an anti-aliased line segment according to one embodiment.

As shown in block 412, the anti-aliased line segment(s) may be displayed on a display device. Alternatively, the anti-aliased line segment(s) may be included in a bitmap which is stored in a memory and not immediately displayed. FIG. 8 illustrates an anti-aliased line segment produced by the method of FIG. 4 according to one embodiment.

In one embodiment, the vertex array generated by the CPU in block 402 may be stored in a memory (e.g., the GPU memory 116). Accordingly, the one or more line segment(s) may be rendered again without retessellation by the CPU. By accounting for a zoom factor, the anti-aliasing system and method described herein may quickly and efficiently maintain the quality of rendered anti-aliased lines when dynamically zooming in. When an anti-aliased line segment is initially rendered, a zoom factor may be associated with the displayed artwork (e.g., as a uniform variable comprising a floating point value) and stored on the GPU. The zoom factor may be generated during the initial tessellation.

In conjunction with a desired zoom, redisplay of one or more line segment(s) may be invoked with a single API (application programming interface) call. After a zoom operation is invoked, the stored vertex array may be retrieved. The vertex shader may use a new world matrix or other technique to transform the vertices from their original positions to their new, zoomed positions. In one embodiment, the vertex shader may again determine the filter lookup values and pivot lookup values. The stored zoom factor may also be retrieved and compared to the zoom factor of the desired zoom. The zoom ratio (i.e., the ratio between the new zoom factor and the old zoom factor) may be sent to the pixel shader. The zoom ratio may be provided to the pixel shader as a uniform variable associated with a plurality of line segment(s).

Figure 9:
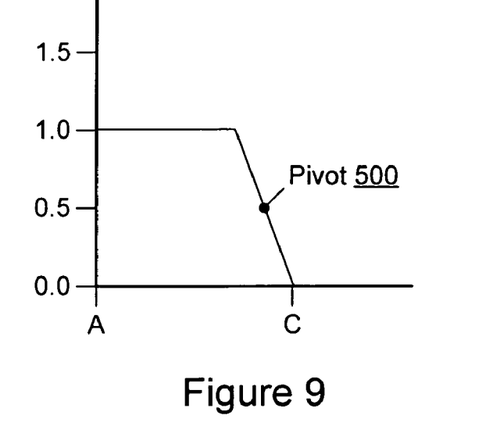
FIG. 9 illustrates a graph of lookup values for a zoomed anti-aliased line segment according to one embodiment.
Figure 10:
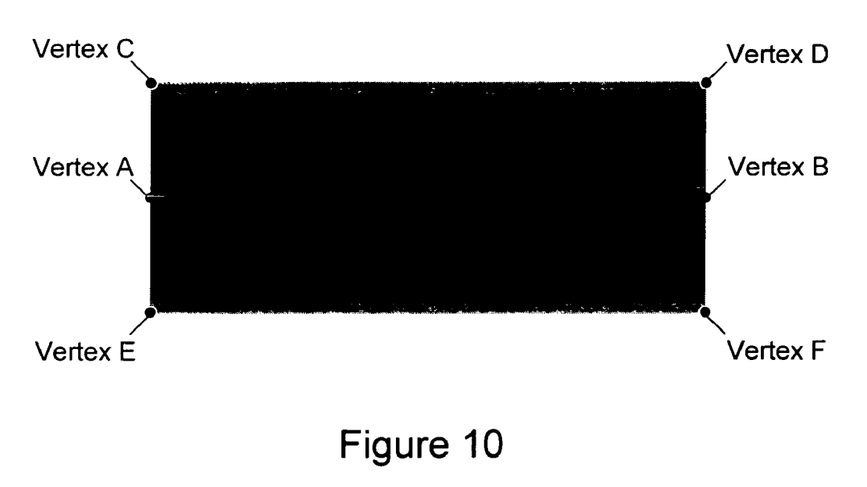
FIG. 10 illustrates a zoomed anti-aliased line segment according to one embodiment.

For example, if the zoom ratio is 2.0, then the one or more line segment(s) will be redrawn at twice their original size. However, the original radius r is now twice as thick, and the unadjusted "smoothed" edges of the anti-aliased line segment(s) would be too large in relation to the rest of the line segment(s). Therefore, to adjust the size of the anti-aliased edges, the slope of the graph of lookup values may be multiplied by the zoom ratio while maintaining the pivot point 500. The resulting graph may be clamped between 0.0 and 1.0. Effectively, this adjustment of the anti-aliasing function by the zoom ratio may scale down the width of the anti-aliased edge while ensuring that it converges at the pivot point (i.e., the "true" line width). FIG. 9 illustrates a graph of lookup values for a zoomed anti-aliased line segment (relative, for example, to the graph of FIG. 7) according to one embodiment. FIG. 10 illustrates a zoomed anti-aliased line segment (relative, for example, to the anti-aliased line segment of FIG. 8) according to one embodiment. In one embodiment, the updated lookup value j may be calculated by the pixel shader on a per-pixel basis as $j = p + (R*(i-p))$, where p is the pivot lookup value, R is the zoom ratio, and i is the original lookup value.

FIG. 11 is a block diagram illustrating constituent elements of a computer system 900 which is configured to implement embodiments of the system and method disclosed herein for performing an anti-aliasing operation using a GPU 110. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows™ from Microsoft Corporation, MacOS™ from Apple Corporation, or any other operating system that enables the operation of software on a hardware platform. The processor(s) 910 may be coupled to one or more of the other illustrated components, such as a memory 920, by at least one communications bus.

In one embodiment, the GPU 110 may be included in a specialized graphics card or other graphics component 956 which is coupled to the processor(s) 910. Additionally, the computer system 900 may include one or more displays 952. In one embodiment, the display(s) 952 may be coupled to the graphics card 956 for display of data provided by the graphics card 956.

Program instructions 940 that may be executable by the processor(s) 910 to implement aspects of the techniques described herein may be partly or fully resident within the memory 920 at the computer system 900 at any point in time. As is described with reference to FIGS. 1 and 2, another set of program instructions 117 may be provided to the GPU 110 for performing anti-aliasing operations on the GPU 110. The memory 920 may be implemented using any appropriate medium such as any of various types of ROM or RAM (e.g., DRAM, SDRAM, RDRAM, SRAM, etc.), or combinations thereof. The program instructions 940 may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions 940 may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 11, as illustrated by the ellipsis shown.

In various embodiments, the blocks shown in FIGS. 3 and 4 may be performed in a different order than the illustrated order. In FIGS. 3 and 4, any of the operations described in the blocks may be performed programmatically (i.e., by a computer according to a computer program). In FIGS. 3 and 4, any of the operations described in the blocks may be performed automatically (i.e., without user intervention).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving input comprising a plurality of vertices at a graphics processing unit (GPU), wherein the plurality of vertices represent one or more line segments; and
generating one or more anti-aliased line segments at the GPU based on the input, wherein generating the one or more anti-aliased line segments comprises:
modifying an intensity of a first edge and a second edge of each line segment based on an anti-aliasing function; and
maintaining a maximum intensity of a central portion of at least one of the line segments, wherein the central portion is greater than one pixel in thickness.

2. The method as recited in claim 1, wherein the input comprising the plurality of vertices is received at the GPU in a batch.

3. The method as recited in claim 1, further comprising:
sending the input comprising the plurality of vertices to the GPU in response to a call to an application programming interface (API).

4. The method as recited in claim 1, further comprising:
storing the plurality of vertices in a memory;
storing an original zoom factor for the plurality of vertices in the memory;
receiving input to invoke a zoom operation, wherein the zoom operation comprises a new zoom factor;
retrieving the plurality of vertices and the original zoom factor from the memory;
determining a zoom ratio between the new zoom factor and the original zoom factor;
modifying the anti-aliasing function based on the zoom ratio; and
generating one or more zoomed anti-aliased line segments at the GPU based on the plurality of vertices retrieved from the memory and based on the modified anti-aliasing function.

5. The method as recited in claim 4, wherein the memory comprises a GPU memory.

6. The method as recited in claim 1, further comprising:
storing the plurality of vertices in a memory on the GPU;
receiving an application programming interface (API) call to invoke redisplay of the one or more line segments;
retrieving the plurality of vertices from the memory on the GPU; and
generating one or more anti-aliased line segments at the GPU based on the retrieved plurality of vertices.

7. The method as recited in claim 1, wherein generating the one or more anti-aliased line segments at the GPU comprises determining a filter lookup value and a pivot lookup value for each of the plurality of vertices.

8. The method as recited in claim 1, wherein maintaining the maximum intensity of the central portion of at least one of the line segments comprises clamping the maximum intensity of the anti-aliasing function.

9. A system, comprising:
a graphics processing unit (GPU);
memory coupled to the GPU, wherein the memory is configured to store program instructions executable by the GPU to:
receive input comprising a plurality of vertices, wherein the plurality of vertices represent one or more line segments; and
generate one or more anti-aliased line segments based on the input, wherein in generating the one or more anti-aliased line segments, the program instructions are executable by the GPU to:
modify an intensity of a first edge and a second edge of each line segment based on an anti-aliasing function; and
maintain a maximum intensity of a central portion of at least one of the line segments, wherein the central portion is greater than one pixel in thickness.

10. The system as recited in claim 9, wherein the input comprising the plurality of vertices is received in a batch.

11. The system as recited in claim 9, further comprising:
at least one central processing unit (CPU); and
additional memory coupled to the at least one CPU, wherein the additional memory is configured to store additional program instructions executable by the at least one CPU to:

send the input comprising the plurality of vertices to the GPU in response to a call to an application programming interface (API).

12. The system as recited in claim 9, wherein the program instructions are executable by the GPU to:
store the plurality of vertices in the memory;
store an original zoom factor for the plurality of vertices in the memory;
receive input to invoke a zoom operation, wherein the zoom operation comprises a new zoom factor;
retrieve the plurality of vertices and the original zoom factor from the memory;
determine a zoom ratio between the new zoom factor and the original zoom factor;
modify the anti-aliasing function based on the zoom ratio; and
generate one or more zoomed anti-aliased line segments based on the plurality of vertices retrieved from the memory and based on the modified anti-aliasing function.

13. The system as recited in claim 9, wherein the program instructions are executable by the GPU to:
store the plurality of vertices in the memory;
receive an application programming interface (API) call to invoke redisplay of the one or more line segments;
retrieve the plurality of vertices from the memory; and
generate one or more anti-aliased line segments based on the retrieved plurality of vertices.

14. The system as recited in claim 9, wherein in generating the one or more anti-aliased line segments, the program instructions are executable by the GPU to determine a filter lookup value and a pivot lookup value for each of the plurality of vertices.

15. The system as recited in claim 9, wherein in maintaining the maximum intensity of the central portion of at least one of the line segments, the program instructions are executable by the GPU to clamp the maximum intensity of the anti-aliasing function.

16. A computer-readable storage medium, comprising program instructions, wherein the program instructions are computer-executable to implement:
receiving input comprising a plurality of vertices at a graphics processing unit (GPU), wherein the plurality of vertices represent one or more line segments; and
generating one or more anti-aliased line segments at the GPU based on the input, wherein generating the one or more anti-aliased line segments comprises:
modifying an intensity of a first edge and a second edge of each line segment based on an anti-aliasing function; and
maintaining a maximum intensity of a central portion of at least one of the line segments, wherein the central portion is greater than one pixel in thickness.

17. The computer-readable storage medium as recited in claim 16, wherein the input comprising the plurality of vertices is received at the GPU in a batch.

18. The computer-readable storage medium as recited in claim 16, wherein the program instructions are further computer-executable to implement:
sending the input comprising the plurality of vertices to the GPU in response to a call to an application programming interface (API).

19. The computer-readable storage medium as recited in claim 16, wherein the program instructions are further computer-executable to implement:
storing the plurality of vertices in a memory;
storing an original zoom factor for the plurality of vertices in the memory;
receiving input to invoke a zoom operation, wherein the zoom operation comprises a new zoom factor;
retrieving the plurality of vertices and the original zoom factor from the memory;
determining a zoom ratio between the new zoom factor and the original zoom factor;
modifying the anti-aliasing function based on the zoom ratio; and
generating one or more zoomed anti-aliased line segments at the GPU based on the plurality of vertices retrieved from the memory and based on the modified anti-aliasing function.

20. The computer-readable storage medium as recited in claim 19, wherein the memory comprises a GPU memory.

21. The computer-readable storage medium as recited in claim 16, wherein the program instructions are further computer-executable to implement:
storing the plurality of vertices in a memory on the GPU;
receiving an application programming interface (API) call to invoke redisplay of the one or more line segments;
retrieving the plurality of vertices from the memory on the GPU; and
generating one or more anti-aliased line segments at the GPU based on the retrieved plurality of vertices.

22. The computer-readable storage medium as recited in claim 16, wherein generating the one or more anti-aliased line segments at the GPU comprises determining a filter lookup value and a pivot lookup value for each of the plurality of vertices.

23. The computer-readable storage medium as recited in claim 16, wherein maintaining the maximum intensity of the central portion of at least one of the line segments comprises clamping the maximum intensity of the anti-aliasing function.

24. A computer-implemented method, comprising:
receiving input comprising a plurality of vertices and a plurality of texture coordinates at a graphics processing unit (GPU) in a batch, wherein the plurality of vertices represent one or more line segments, and wherein each of the plurality of texture coordinates corresponds to one of the plurality of vertices; and
generating one or more anti-aliased line segments at the GPU based on the input, wherein generating the one or more anti-aliased line segments comprises:
modifying an intensity of a first edge and a second edge of each line segment based on an anti-aliasing function which determines an intensity of each of the plurality of vertices based on information stored in the corresponding one of the plurality of texture coordinates.

25. The method as recited in claim 24, wherein the stored information comprises a line width at the corresponding one of the plurality of vertices.

26. The method as recited in claim 24, wherein the stored information comprises an indication that the corresponding one of the plurality of vertices is either an edge vertex or a central vertex.

* * * * *